United States Patent
Huang et al.

(10) Patent No.: US 10,476,062 B2
(45) Date of Patent: Nov. 12, 2019

(54) BATTERY CASE OF ELECTRONIC DEVICE

(71) Applicant: TAIWAN FU HSING INDUSTRIAL CO., LTD., Kaohsiung (TW)

(72) Inventors: Lien-Hsi Huang, Kaohsiung (TW); Wen-Chieh Lee, Kaohsiung (TW)

(73) Assignee: TAIWAN FU HSING INDUSTRIAL CO., LTD., Kaohsiung (TW)

( * ) Notice: Subject to any disclaimer, the term of this patent is extended or adjusted under 35 U.S.C. 154(b) by 67 days.

(21) Appl. No.: 15/841,309

(22) Filed: Dec. 14, 2017

(65) Prior Publication Data

US 2018/0342719 A1 Nov. 29, 2018

(30) Foreign Application Priority Data

May 23, 2017 (TW) .............................. 106116963 A (51) Int. Cl.
| | |
|---|---|
| H01M 2/00 | (2006.01) |
| H01M 2/10 | (2006.01) |

(52) U.S. Cl.
CPC ....... H01M 2/1094 (2013.01); H01M 2/1055 (2013.01)

(58) Field of Classification Search
CPC .......................... H01M 2/1094; H01M 2/1055
See application file for complete search history.

(56) References Cited

U.S. PATENT DOCUMENTS

| | | | | |
|---|---|---|---|---|
| 5,866,987 A | * | 2/1999 | Wut ..................... | A43B 1/0036 315/119 |
| 2012/0249071 A1 | * | 10/2012 | Yang ..................... | H02J 7/0024 320/110 |

FOREIGN PATENT DOCUMENTS

| | | |
|---|---|---|
| CN | 203706149 U | 7/2014 |
| CN | 204257718 U | 4/2015 |
| CN | 205028933 U | 2/2016 |
| TW | M304779 | 1/2007 |

* cited by examiner

*Primary Examiner* — Cynthia H Kelly
*Assistant Examiner* — Monique M Wills
(74) *Attorney, Agent, or Firm* — Winston Hsu (57) ABSTRACT

A battery case of an electronic device includes a housing, a first conductor and a second conductor. The housing includes a first side wall, a second side wall, a bottom part, a first blocking part and a second blocking part. The bottom part is connected between the first side wall and the second side wall to define an accommodation space, for accommodating a battery having a main body arranged with first and second electrodes respectively on two opposite ends of the main body. The first blocking part is protruded from the first side wall and extended toward the second side wall. The second blocking part is protruded from the second side wall and extended toward the first side wall. The first conductor is arranged on the first side wall for contacting the first electrode. The second conductor is arranged on the second side wall for contacting the second electrode.

10 Claims, 10 Drawing Sheets

BATTERY CASE OF ELECTRONIC DEVICE

BACKGROUND OF THE INVENTION

1. Field of the Invention

The present invention relates to a battery case of an electronic device, and more particularly, to a battery case of an electronic device capable of preventing batteries from detaching.

2. Description of the Prior Art

An electronic device is usually arranged with a battery case for accommodating batteries. Generally, the battery case is arranged with a metal sheet and a metal spring for respectively contacting electrodes on two ends of a battery. The metal spring of the battery case is configured to apply a force to a negative electrode of the battery to push a positive electrode of the battery to abut against the metal sheet, so as to hold the battery in the battery case. However, when the electronic device receives impact, the positive electrode of the battery may slide relative to the metal sheet, so as to cause poor contact between the positive electrode of the battery and the metal sheet of the battery case, and even cause the battery to detach from the battery case. The battery case of the electronic device of the prior art cannot stably hold the battery to ensure the electronic device operating normally.

SUMMARY OF THE INVENTION

The present invention provides a battery case of an electronic device. The battery case comprises a housing, a first conductor and a second conductor. The housing comprises a first side wall, a second side wall, a bottom part, a first blocking part and a second blocking part. The second side wall is opposite to the first side wall. The bottom part is connected between the first side wall and the second side wall, wherein an accommodation space is defined by the first side wall, the second side wall and the bottom part for accommodating a battery. The battery comprises a main body, a first electrode arranged on a first end of the main body, and a second electrode arranged on a second end of the main body. The first blocking part is protruded from the first side wall and extended toward the second side wall for blocking the first end of the main body from moving away from the bottom part. The second blocking part is protruded from the second side wall and extended toward the first side wall for blocking the second end of the main body from moving away from the bottom part, wherein a distance between the first blocking part and the second blocking part along a longitudinal direction of the main body of the battery is smaller than a length of the main body of the battery. The first conductor is arranged on the first side wall and configured to contact the first electrode. The second conductor is arranged on the second side wall and configured to contact the second electrode.

In one embodiment of the present invention, the first blocking part has a first curved surface corresponding to a cylindrical side surface of the main body of the battery, and the second blocking part has a second curved surface corresponding to the cylindrical side surface of the main body of the battery.

In one embodiment of the present invention, a distance between the first blocking part and the second blocking part along a width direction of the main body of the battery is smaller than a width of the main body of the battery.

In one embodiment of the present invention, orthogonal projection of the first blocking part on the bottom part partially overlaps orthogonal projection of the main body of the battery on the bottom part, and orthogonal projection of the second blocking part on the bottom part partially overlaps the orthogonal projection of the main body of the battery on the bottom part.

In one embodiment of the present invention, the first blocking part and the second blocking part are respectively arranged at two opposite sides of a central axis of the main body of the battery.

In one embodiment of the present invention, the housing further comprises a third side wall and a fourth side wall. The third side wall is connected to the first side wall, the second side wall and the bottom part. The fourth side wall is connected to the first side wall, the second side wall and the bottom part. The fourth side wall is opposite to the third side wall.

In one embodiment of the present invention, the second blocking part has an inclined surface facing the fourth side wall.

In one embodiment of the present invention, the battery case further has fixing structures respectively arranged on the third side wall and the fourth side wall, the fixing structure is substantially in an curved shape and configured to abut against a cylindrical side surface of a main body of another battery adjacent to the battery.

In one embodiment of the present invention, a first groove is formed on the first side wall for accommodating the first conductor, and a second groove is formed on the second side wall for accommodating the second conductor.

In one embodiment of the present invention, the second blocking part has a curved surface corresponding to the cylindrical side surface of the main body of the battery, and an inclined surface facing another battery adjacent to the battery.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
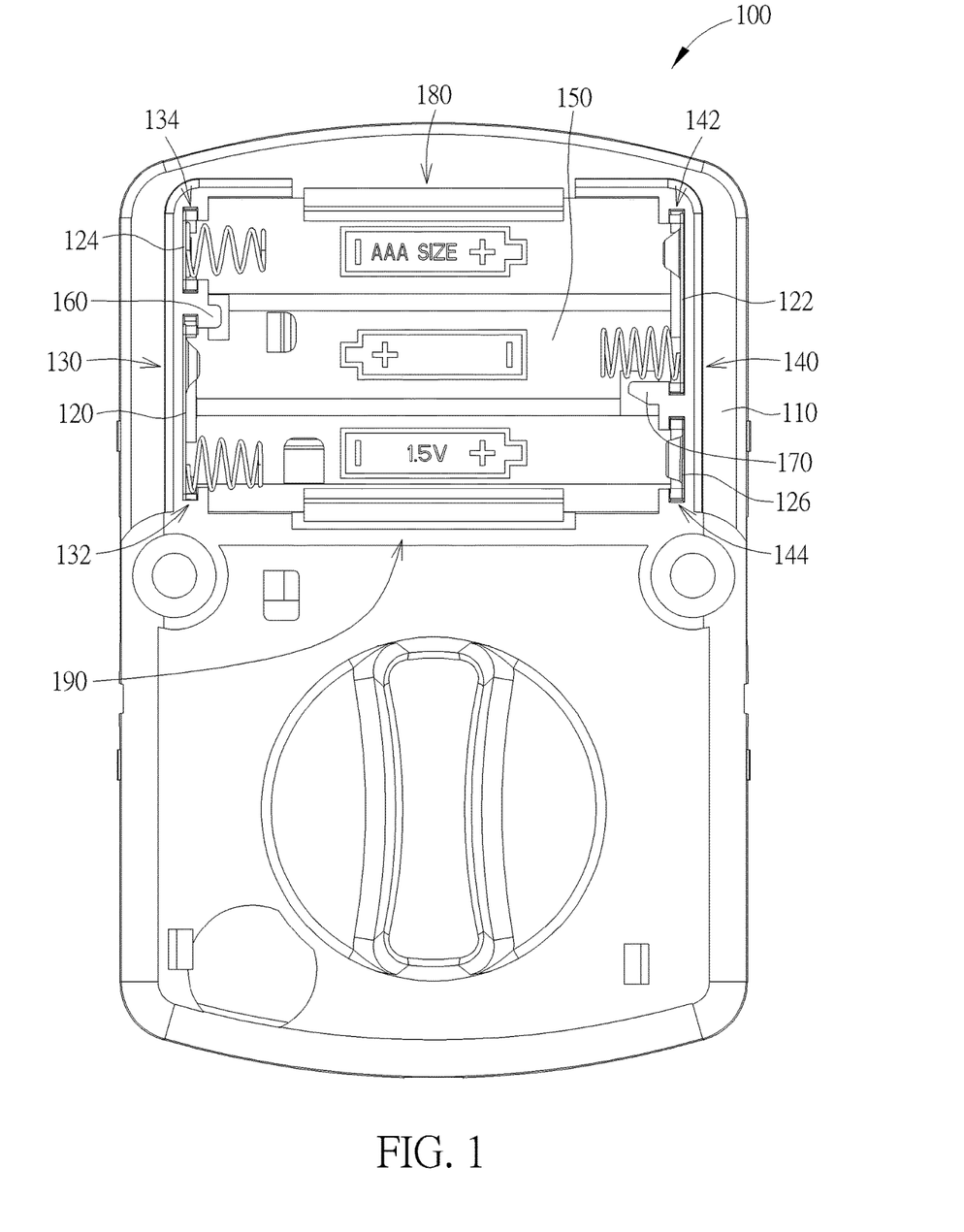
FIG. 1 is a top view of a battery case of an electronic device of the present invention.
Figure 2:
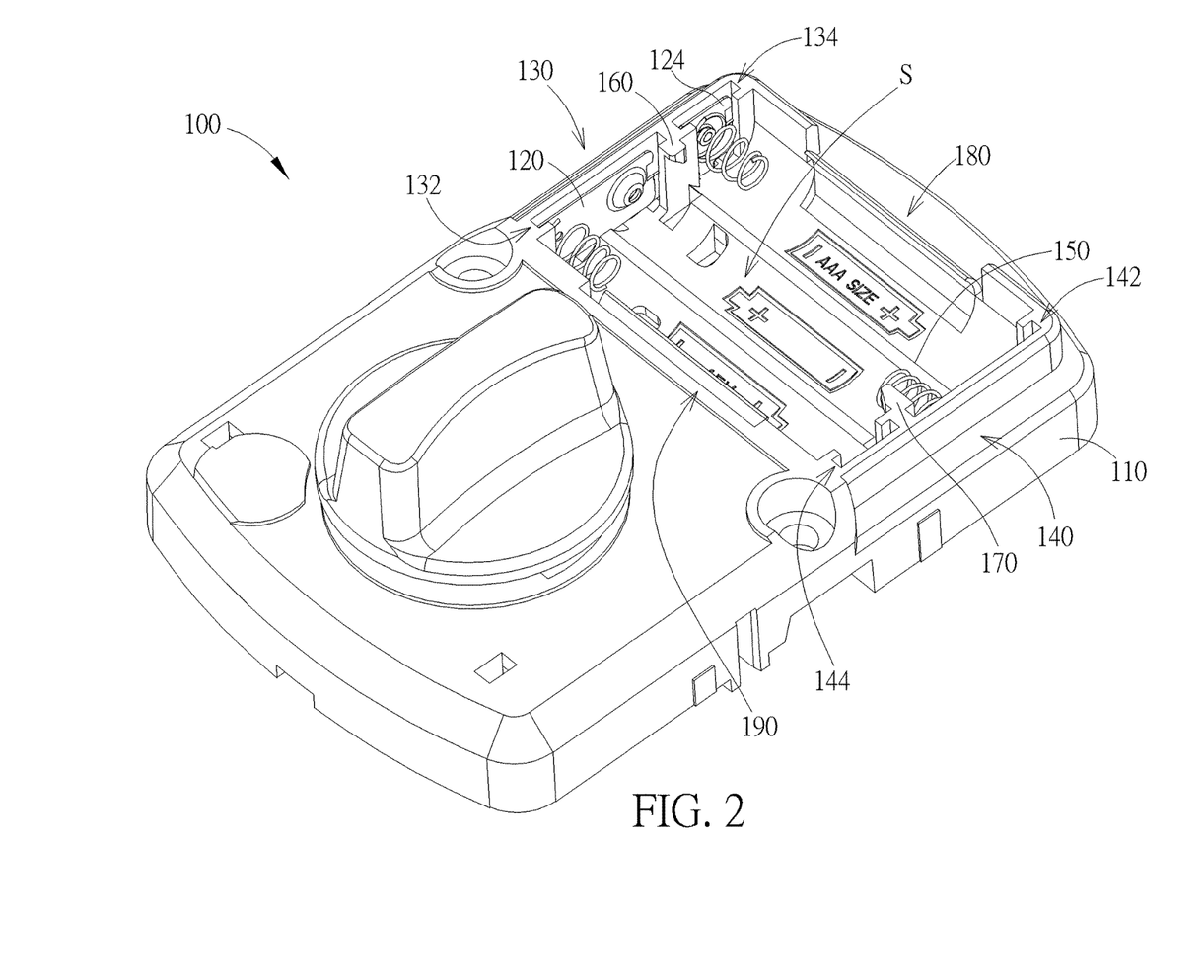
FIG. 2 is a diagram showing the battery case of FIG. 1 in another angle.
Figure 3:
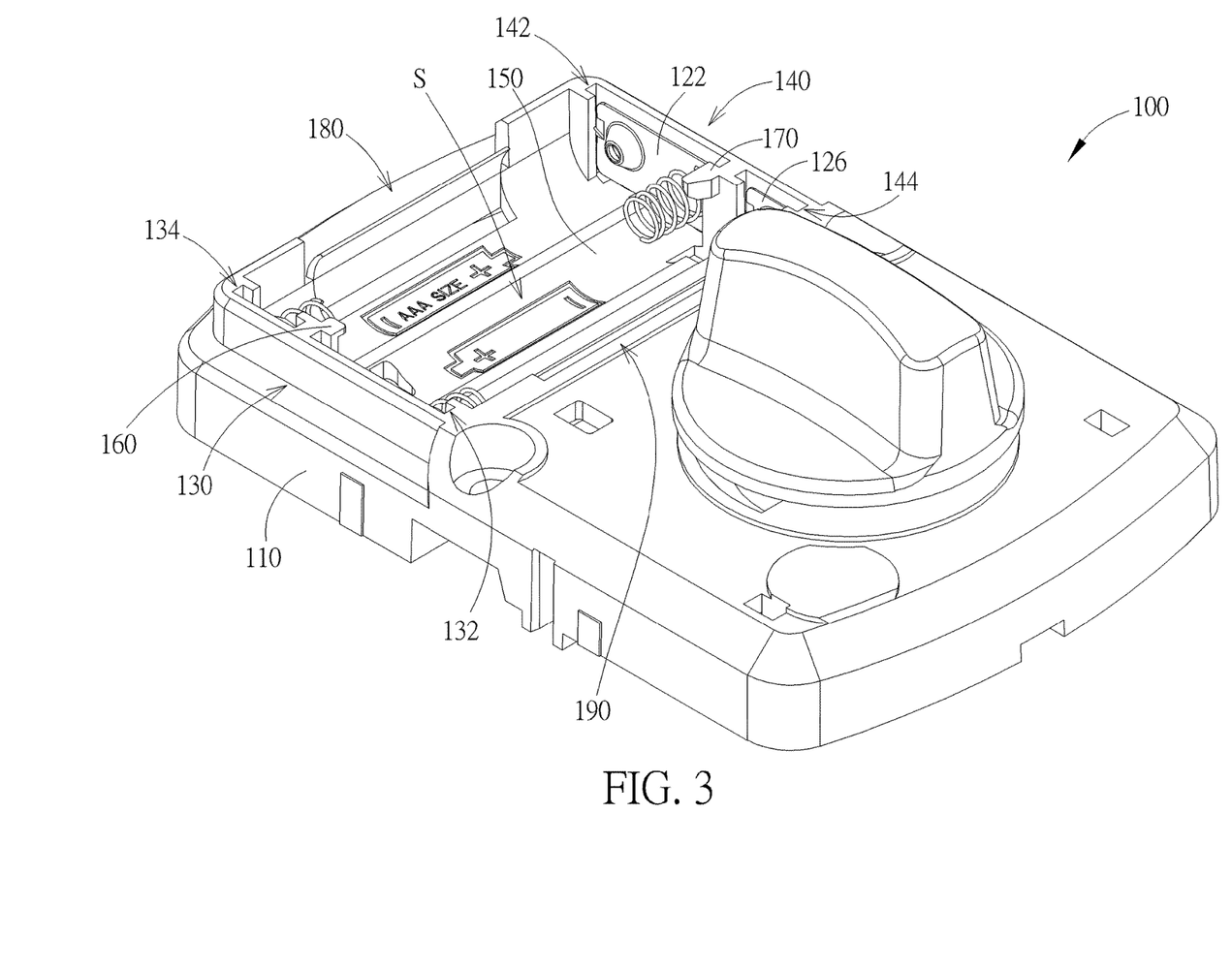
FIG. 3 is a diagram showing the battery case of FIG. 1 in another angle.

Please refer to FIG. 1 to FIG. 3. FIG. 1 is a top view of a battery case of an electronic device of the present invention. FIG. 2 is a diagram showing the battery case of FIG. 1 in another angle. FIG. 3 is a diagram showing the battery case of FIG. 1 in another angle. As shown in figures, the battery case 100 of the electronic device of the present invention comprises a housing 110, a first conductor 120 and a second conductor 122. The housing 110 comprises a first side wall 130, a second side wall 140, a bottom part 150, a first blocking part 160 and a second blocking part 170. A first groove 132 is formed on the first side wall 130 for accommodating the first conductor 120. The second side wall 140 is opposite to the first side wall 130. A second groove 142 is formed on the second side wall 140 for accommodating the second conductor 122. The bottom part 150 is connected between the first side wall 130 and the second side wall 140. An accommodation space S is defined by the first side wall 130, the second side wall 140 and the bottom part 150 for accommodating batteries. In the present embodiment, the accommodation space S is configured to accommodate three batteries, but the present invention is not limited thereto. The number of the batteries accommodated in the accommodation space S can be changed according to design requirements. The first blocking part 160 is protruded from the first side wall 130 and extended toward the second side wall 140. The second blocking part 170 is protruded from the second side wall 140 and extended toward the first side wall 130.

In addition, the battery case 100 further comprises a third conductor 124 and a fourth conductor 126. The third conductor 124 is accommodated in a third groove 134 on the first side wall 130. The fourth conductor 126 is accommodated in a fourth groove 144 on the second side wall 140. The first to fourth conductors 120, 122, 124, 126 are configured to contact electrodes of the batteries, in order to connect the batteries in series (or parallel). In the figures, shapes and structures of the first to fourth conductors 120, 122, 124, 126 are shown for illustration, but the present invention is not limited thereto. The shapes and structures of the first to fourth conductors 120, 122, 124, 126 can be changed according to design requirements.

On the other hand, the housing 110 further comprises a third side wall 180 and a fourth side wall 190. The third side wall 180 is connected to the first side wall 130, the second side wall 140 and the bottom part 150. The fourth side wall 190 is connected to the first side wall 130, the second side wall 140 and the bottom part 150. The fourth side wall 190 is opposite to the third side wall 180.

Figure 4:
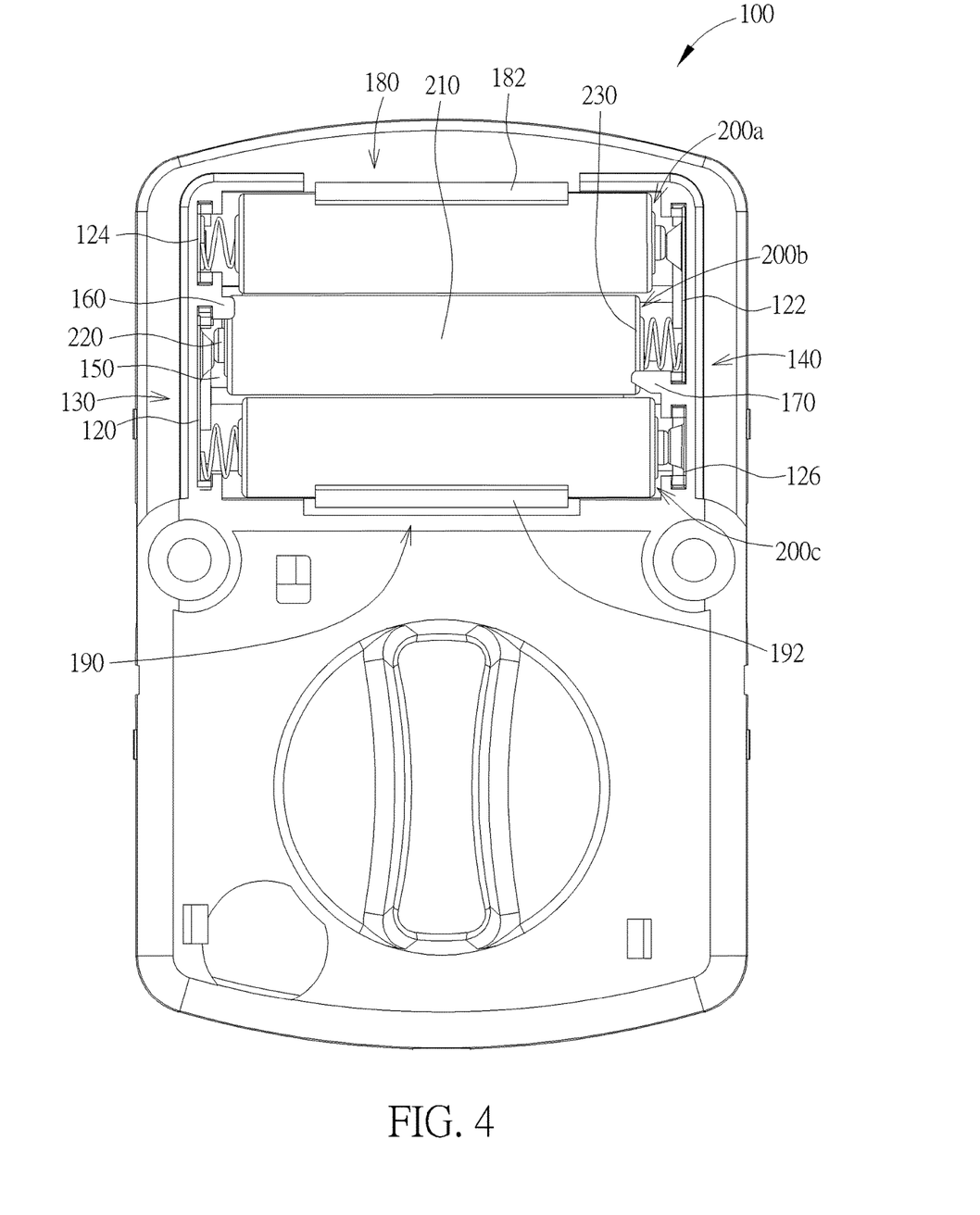
FIG. 4 is a top view of the battery case of the electronic device of the present invention accommodating batteries.
Figure 5:
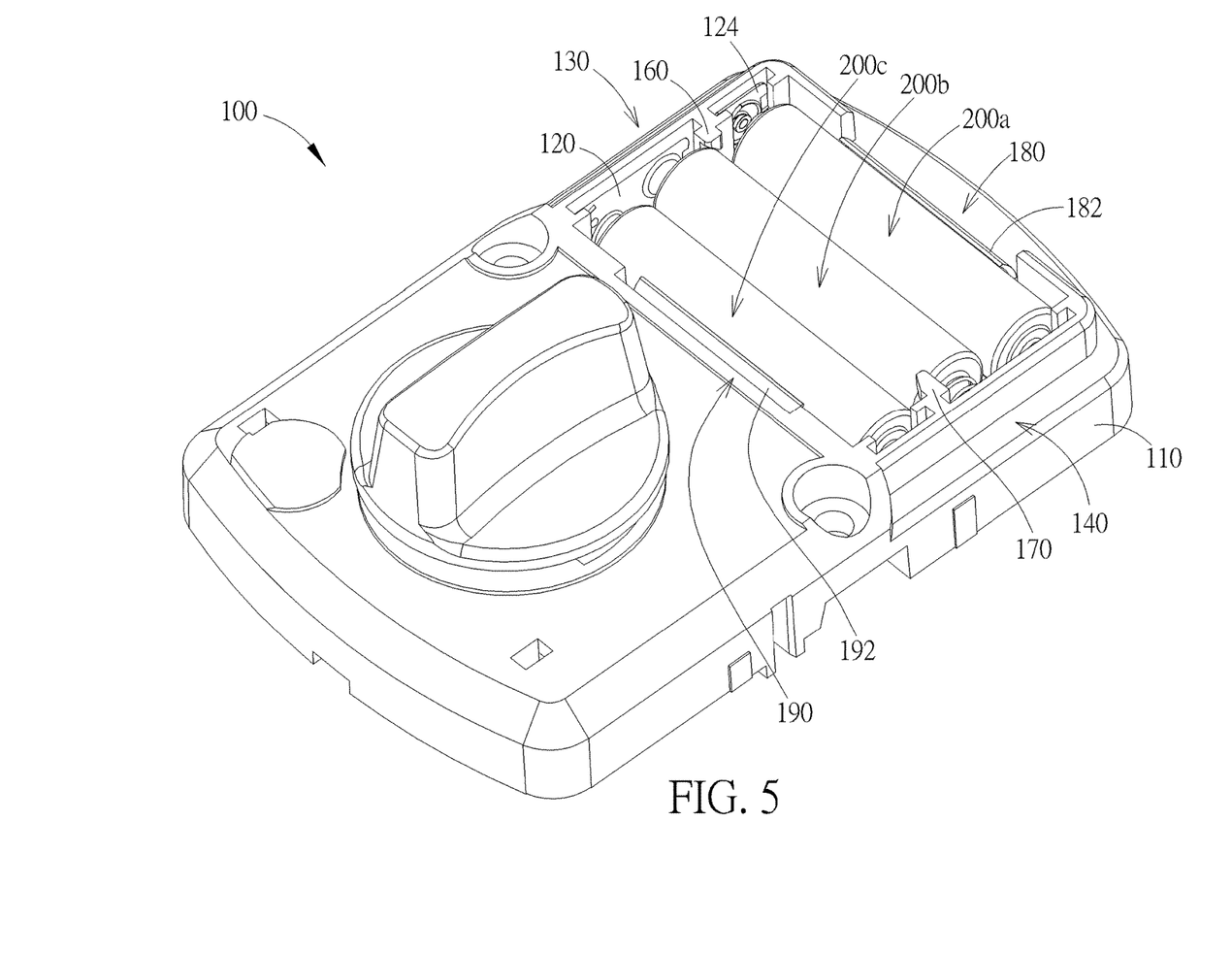
FIG. 5 is a diagram showing the battery case of FIG. 4 in another angle.
Figure 6:
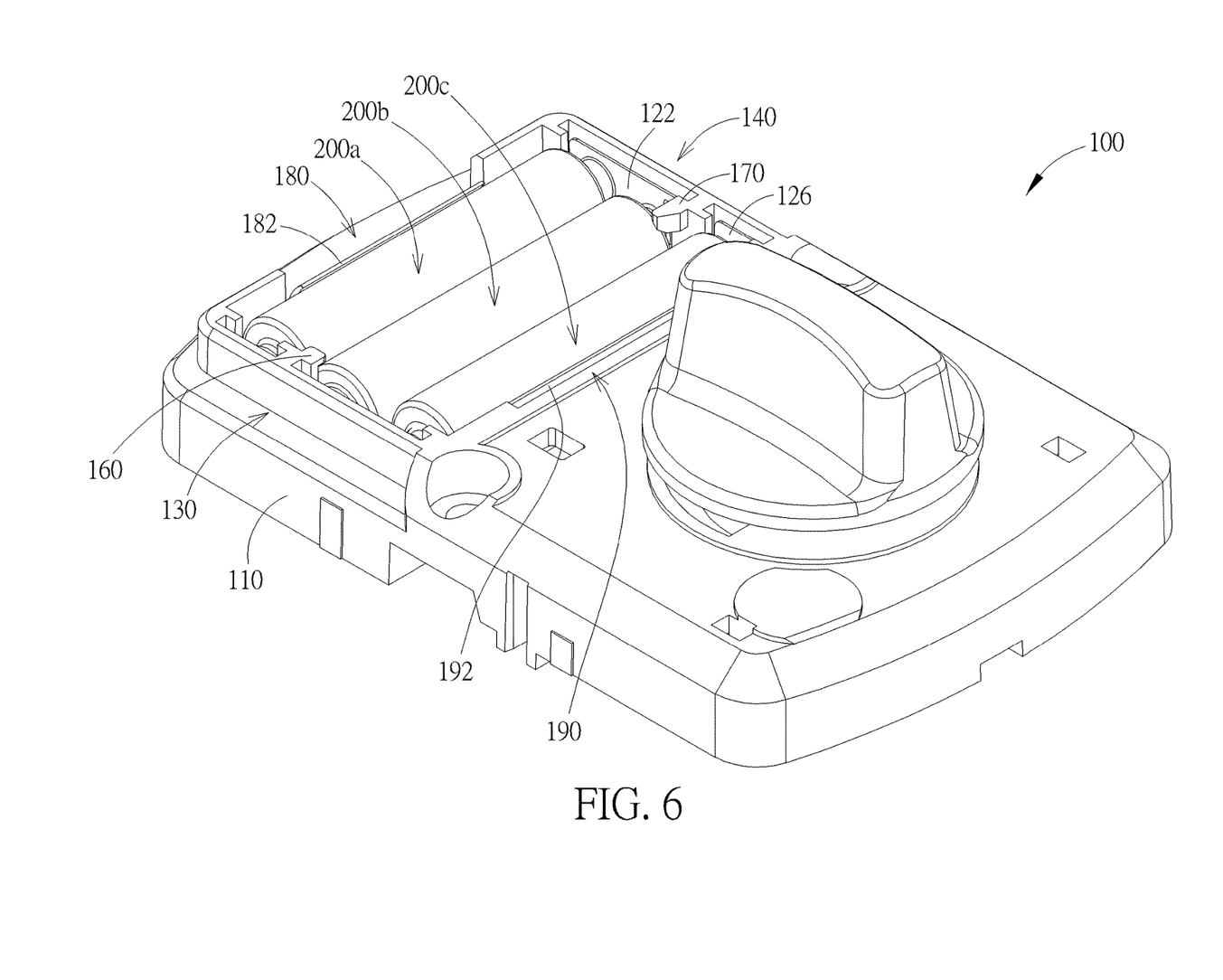
FIG. 6 is a diagram showing the battery case of FIG. 4 in another angle.

Please refer to FIG. 4 to FIG. 6. FIG. 4 is a top view of the battery case of the electronic device of the present invention accommodating the batteries. FIG. 5 is a diagram showing the battery case of FIG. 4 in another angle. FIG. 6 is a diagram showing the battery case of FIG. 4 in another angle. As shown in figures, in the present embodiment, the battery case 100 is configured to accommodate a plurality of batteries 200a, 200b, 200c. Each of the batteries 200a, 200b, 200c comprises a main body 210, a first electrode 220 arranged on a first end of the main body 210, and a second electrode 230 arranged on a second end of the main body 210. The first electrode 220 and the second electrode 230 of the battery 200a respectively contact the second conductor 122 and the third conductor 124. The first electrode 220 and the second electrode 230 of the battery 200b respectively contact the first conductor 120 and the second conductor 122. The first electrode 220 and the second electrode 230 of the battery 200c respectively contact the fourth conductor 126 and the first conductor 120. The first blocking part 160 and the second blocking part 170 of the battery case 100 are configured to stably hold the battery 200b in the battery case 100 in order to prevent the battery 200b from detaching from the battery case 100. For example, the first blocking part 160 is configured to block the first end of the main body 210 of the battery 200b from moving away from the bottom part 150; and the second blocking part 170 is configured to block the second end of the main body 210 of the battery 200b from moving away from the bottom part 150. A distance between the first blocking part 160 and the second blocking part 170 along a longitudinal direction of the main body 210 of the battery 200b is smaller than a length of the main body 210 of the battery 200b. Therefore, when the battery 200b is placed into the battery case 100, the two ends of the battery 200b will be respectively blocked by the first blocking part 160 and the second blocking part 170 (orthogonal projection of the first blocking part 160 on the bottom part 150 partially overlaps orthogonal projection of the main body 210 of the battery 200b on the bottom part 150, and orthogonal projection of the second blocking part 170 on the bottom part 150 partially overlaps the orthogonal projection of the main body 210 of the battery 200b on the bottom part 150), so as to prevent the two ends of the battery 200b from moving outward relative to the battery case 100 while the battery 200b receives impact.

In addition, in the present embodiment, the first blocking part 160 and the second blocking part 170 are respectively arranged at two opposite sides of a central axis of the main body 210 of the battery 200b. A distance between the first blocking part 160 and the second blocking part 170 along a width direction of the main body 210 of the battery 200b is smaller than a width of the main body 210 of the battery 200b. As such, the battery 200b can be more stably held in the battery case 100. However, in other embodiments of the present invention, the first blocking part 160 and the second blocking part 170 can be arranged at the same side of the central axis of the main body 210 of the battery 200b.

On the other hand, the battery case 100 further has fixing structures 182, 192 respectively arranged on the third side wall 180 and the fourth side wall 190. The fixing structure 182, 192 is substantially in a curved shape. The fixing structure 182 is configured to abut against a cylindrical side surface of the main body 210 of the battery 200a, in order to hold the battery 200a in the battery case 100. The fixing structure 192 is configured to abut against a cylindrical side surface of the main body 210 of the battery 200c, in order to hold the battery 200c in the battery case 100. As such, when the batteries 200a, 200b, 200c are placed into the battery case 100, the batteries 200a, 200b, 200c can be stably held in the battery case 100. However, in other embodiments of the present invention, the first side wall 130 and the second side wall 140 can be formed with other blocking parts (similar to the first blocking part 160 and the second blocking part 170) to replace the fixing structures 182, 192, in order to hold the batteries 200a, 200c in the battery case 100.

Figure 7:
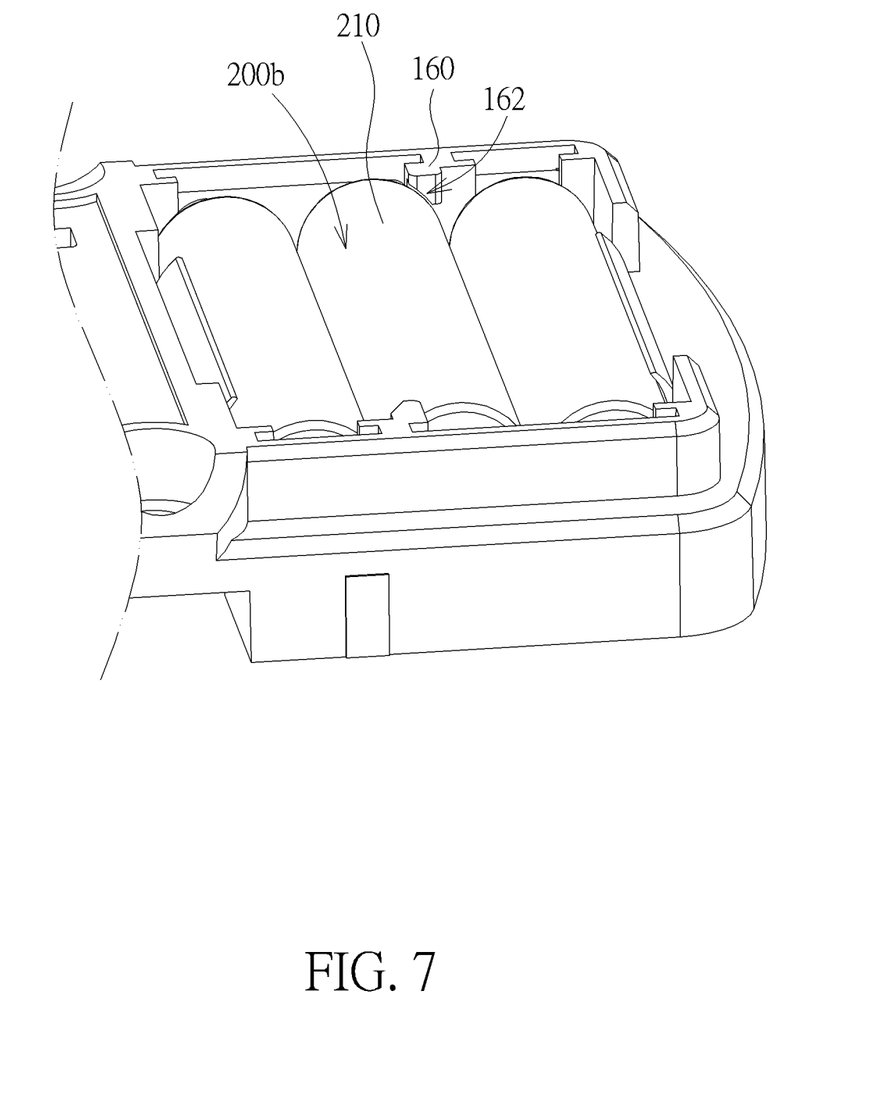
FIG. 7 is a partial enlarged view of the battery case of the electronic device of the present invention.
Figure 8:
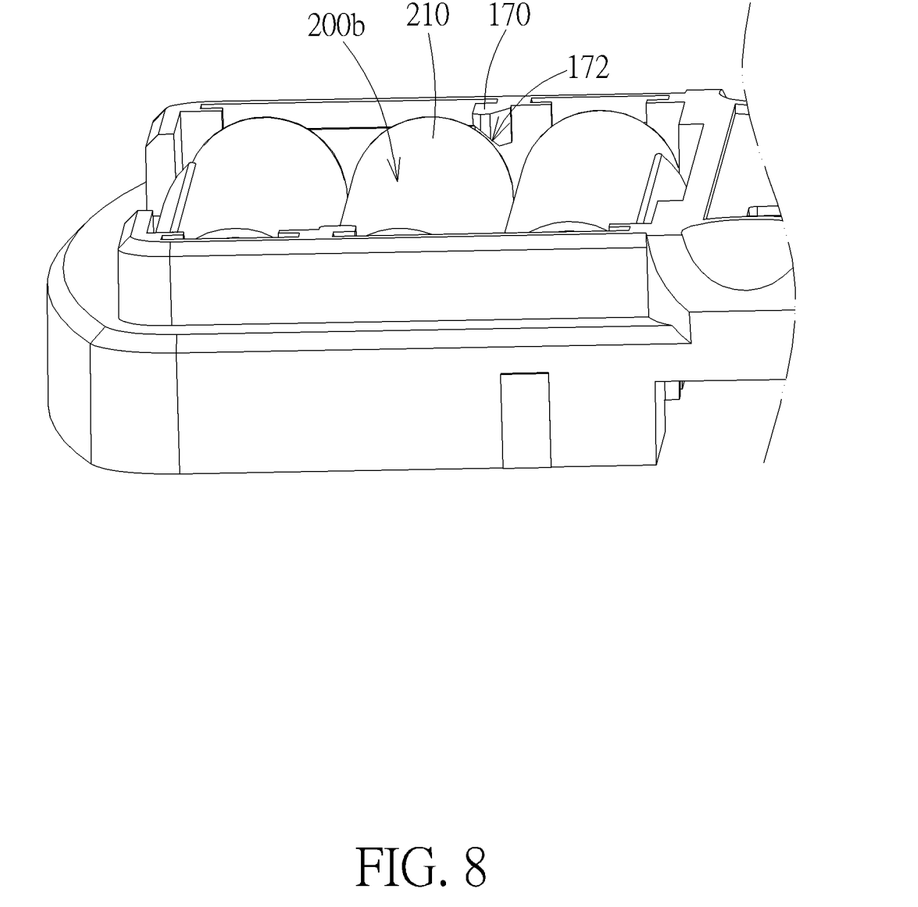
FIG. 8 is a partial enlarged view of the battery case of the electronic device of the present invention.

Please refer to FIG. 7 and FIG. 8. FIG. 7 and FIG. 8 are partial enlarged views of the battery case of the electronic device of the present invention. As shown in figures, the first blocking part 160 has a first curved surface 162 corresponding to a cylindrical side surface of the main body 210 of the battery 200b, in order to increase a contact area between the first blocking part 160 and the main body 210 of the battery 200b. Similarly, the second blocking part 170 has a second curved surface 172 corresponding to the cylindrical side surface of the main body 210 of the battery 200b, in order to increase a contact area between the second blocking part 170 and the main body 210 of the battery 200b. As such, the battery 200b can be more stably held in the battery case 100.

Figure 9:
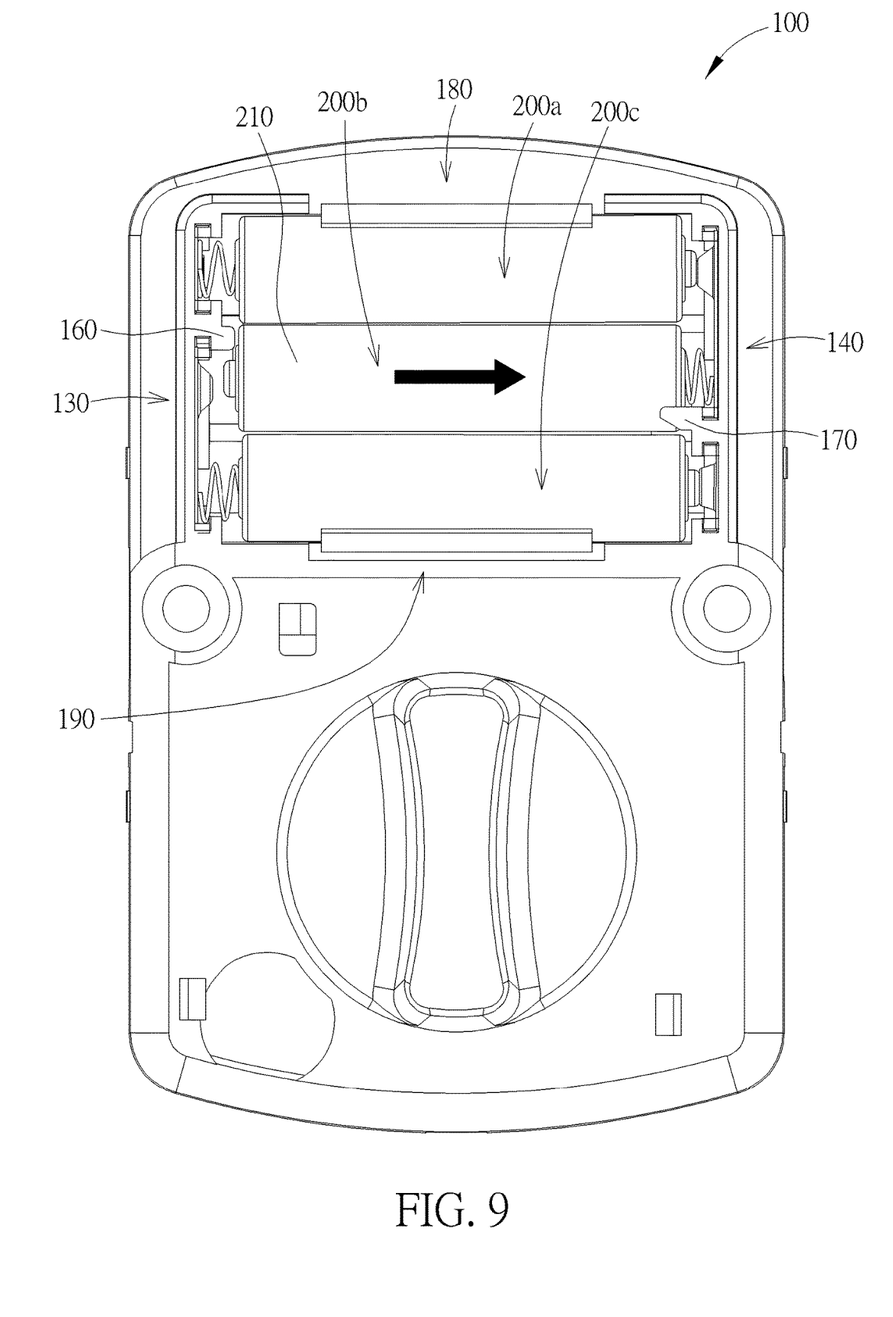
FIG. 9 is a diagram showing the battery being going to be removed from the battery case of the electronic device of the present invention.
Figure 10:
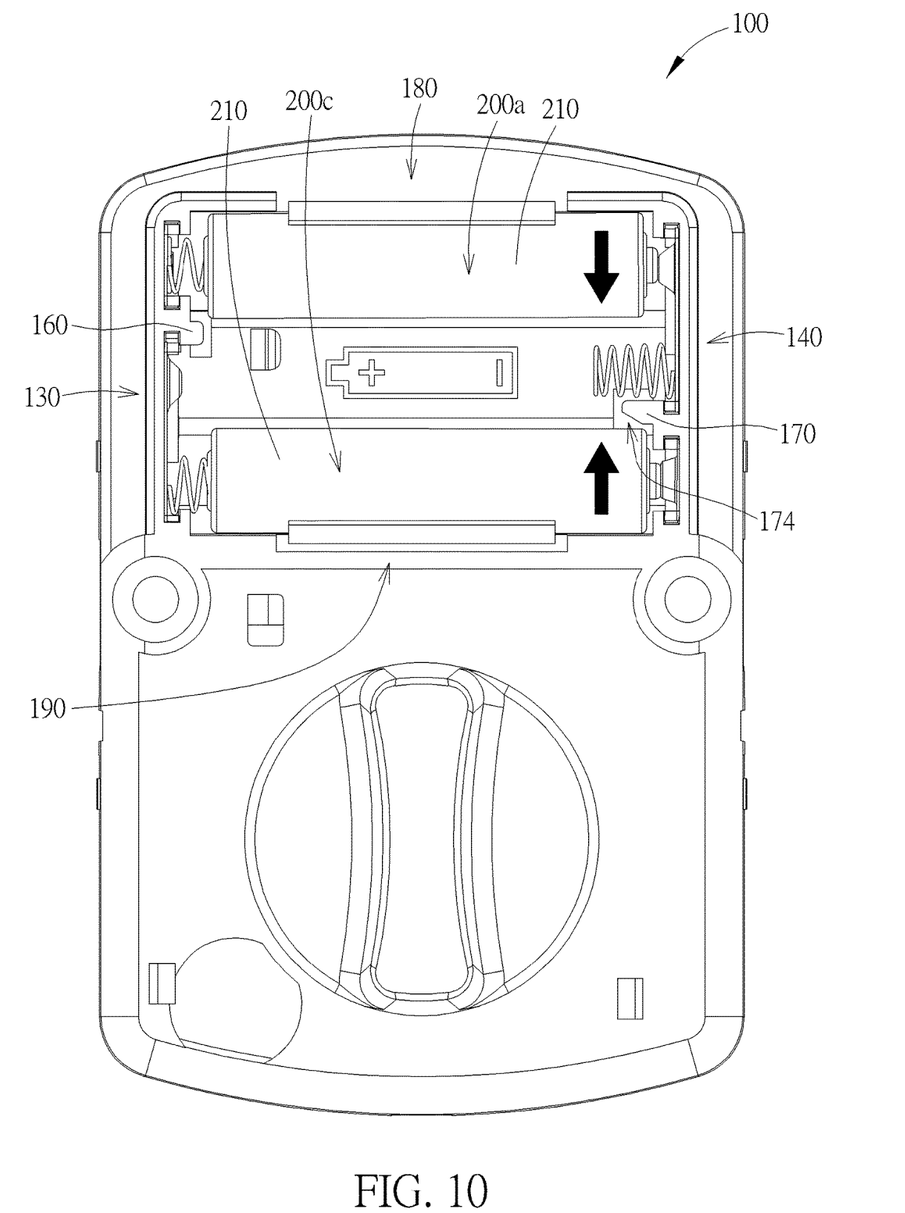
FIG. 10 is a diagram showing the battery being removed from the battery case of the electronic device of the present invention.

Please refer to FIG. 9 and FIG. 10. FIG. 9 is a diagram showing the battery being going to be removed from the battery case of the electronic device of the present invention. FIG. 10 is a diagram showing the batteries being removed from the battery case of the electronic device of the present invention. As shown in figures, in order to remove the batteries 200a, 200b, 200c, a user can first move the battery 200b toward the second side wall 140, such that the first blocking part 160 no longer blocks the first end of the main body 210 of the battery 200b. Then the user can move the first end of the main body 210 of the battery 200b upward relative to the battery case 100 to further detach the battery 200b from the battery case 100. Thereafter, the user can use a gap between the battery 200a and the battery 200c to allow the first ends of the main bodies 210 of the battery 200a and the battery 200c to laterally move, in order to further detach the battery 200a and the battery 200c from the battery case 100. The batteries 200a, 200b, 200c can be placed into the battery case 100 by simply reversing the aforementioned detaching process. Therefore, no further illustration is provided.

In addition, the second blocking part 170 can have an inclined surface 174 facing the fourth side wall 190 (or facing the battery 200c), such that the battery 200c can be detached more easily.

In contrast to the prior art, the battery case of the electronic device of the present invention has the blocking parts protruded from the side walls to block the two ends of the main body of the battery from moving away from the bottom part of the battery case, so as to hold the battery in the battery case stably. Therefore, the battery case of the electronic device of the present invention can prevent the battery from detaching, in order to ensure normal operation of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery case of an electronic device, comprising:
   a housing, comprising:
   a first side wall;
   a second side wall opposite to the first side wall;
   a bottom part connected between the first side wall and the second side wall, wherein an accommodation space is defined by the first side wall, the second side wall and the bottom part for accommodating a battery, the battery comprises a main body, a first electrode arranged on a first end of the main body, and a second electrode arranged on a second end of the main body;
   a first blocking part protruded from the first side wall and extended toward the second side wall for blocking the first end of the main body from moving away from the bottom part; and
   a second blocking part protruded from the second side wall and extended toward the first side wall for blocking the second end of the main body from moving away from the bottom part, wherein a distance between the first blocking part and the second blocking part along a longitudinal direction of the main body of the battery is smaller than a length of the main body of the battery, and a dimension of length and/or width of the first blocking part in the longitudinal direction along the main body is smaller than a dimension of length and/or width of the second blocking part in the longitudinal direction along the main body;
   a first conductor arranged on the first side wall and configured to contact the first electrode; and
   a second conductor arranged on the second side wall and configured to contact the second electrode.

2. The battery case of claim 1, wherein the first blocking part has a first curved surface corresponding to a cylindrical side surface of the main body of the battery, the second blocking part has a second curved surface corresponding to the cylindrical side surface of the main body of the battery.

3. The battery case of claim 1, wherein a distance between the first blocking part and the second blocking part along a width direction of the main body of the battery is smaller than a width of the main body of the battery.

4. The battery case of claim 1, wherein orthogonal projection of the first blocking part on the bottom part partially overlaps orthogonal projection of the main body of the battery on the bottom part, and orthogonal projection of the second blocking part on the bottom part partially overlaps the orthogonal projection of the main body of the battery on the bottom part.

5. The battery case of claim 1, wherein the first blocking part and the second blocking part are respectively arranged at two opposite sides of a central axis of the main body of the battery.

6. The battery case of claim 1, wherein the housing further comprises:
   a third side wall connected to the first side wall, the second side wall and the bottom part; and
   a fourth side wall connected to the first side wall, the second side wall and the bottom part, the fourth side wall being opposite to the third side wall.

7. The battery case of claim 6, wherein the second blocking part has an inclined surface facing the fourth side wall.

8. The battery case of claim 6, wherein the battery case further has fixing structures respectively arranged on the third side wall and the fourth side wall, the fixing structure is substantially in an curved shape and configured to abut against a cylindrical side surface of a main body of another battery adjacent to the battery.

9. The battery case of claim 1, wherein a first groove is formed on the first side wall for accommodating the first conductor, a second groove is formed on the second side wall for accommodating the second conductor.

10. The battery case of claim 1, wherein the second blocking part has a curved surface corresponding to a cylindrical side surface of the main body of the battery, and an inclined surface facing another battery adjacent to the battery.

* * * * *